(12) United States Patent
Miller

(10) Patent No.: US 8,522,417 B2
(45) Date of Patent: Sep. 3, 2013

(54) VIBRATION DAMPER

(75) Inventor: David Miller, Nottingham (GB)

(73) Assignee: Rolls-Royce, PLC, London (GB)

( * ) Notice: Subject to any disclaimer, the term of this patent is extended or adjusted under 35 U.S.C. 154(b) by 892 days.

(21) Appl. No.: 12/693,807

(22) Filed: Jan. 26, 2010

(65) Prior Publication Data

US 2010/0232968 A1    Sep. 16, 2010

(30) Foreign Application Priority Data

Mar. 13, 2009 (GB) .................................. 0904306.8

(51) Int. Cl.
*B21D 53/78* (2006.01)

(52) U.S. Cl.
USPC ......... 29/523; 29/889.7; 29/889.71; 29/522.1

(58) Field of Classification Search
USPC ........ 29/889.2, 889.21, 889.6, 889.7, 889.71, 29/889.72, 889.722, 897, 897.2, 454, 505, 29/507, 522.1, 523; 415/119, 139, 173.1; 416/189, 190, 500
See application file for complete search history.

(56) References Cited

U.S. PATENT DOCUMENTS

| | | | |
|---|---|---|---|
| 3,966,357 A * | 6/1976 | Corsmeier | 416/97 R |
| 5,284,011 A | 2/1994 | Von Benken | |
| 7,300,256 B2 * | 11/2007 | Masserey et al. | 416/230 |
| 8,262,363 B2 * | 9/2012 | Gerber et al. | 416/229 R |
| 2010/0202888 A1 * | 8/2010 | Miller | 416/190 |

FOREIGN PATENT DOCUMENTS

| | | |
|---|---|---|
| EP | 1 538 304 A2 | 6/2005 |
| EP | 1 544 413 A2 | 6/2005 |
| GB | 2 123 489 A | 2/1984 |

OTHER PUBLICATIONS

Jul. 7, 2009 Search Report issued in British Patent Application No. GB0904306.8.

* cited by examiner

*Primary Examiner* — David Bryant
*Assistant Examiner* — Ryan J Walters
(74) *Attorney, Agent, or Firm* — Oliff & Berridge, PLC

(57) ABSTRACT

Vibration damping is important with regard to such components as hollow turbine blades in gas turbine engines. Traditionally damping has occurred through damping elements secured at the root or tip of such blades. Such damping is not optimised and results in potential problems with wear in operational life. By providing a tube of deformable material which can be located within a hollow cavity it is possible to provide an element which through friction engagement can absorb vibration energy and therefore damp such vibration. The tube incorporates a number of cuts and/or grooves in an appropriate pattern in order to define a deformation profile once the tube is expanded in location. The tube is secured in position internally upon an expandable element which is typically an inflatable device. Once in position the tube is retained in its expanded deformable profile and the engagement between the tube and the hollow cavity wall surface results in energy absorption through vibration episodes. It is also possible to provide a tube formed from a shape memory alloy which will expand of its own right in location to engage the hollow cavity wall surfaces for energy absorption during vibration episodes.

14 Claims, 1 Drawing Sheet

VIBRATION DAMPER

The present invention relates to vibration dampers and more particularly to vibration dampers utilised in hollow blades of a gas turbine engine.

It will be understood that gas turbine engines generally incorporate a number of hollow blades to reduce weight as well as provide means by which cooling of the blades can be achieved. These blades by their nature are subject to vibrations during operation of the engine and such vibrations must be damped through appropriate dampers to avoid damage and premature failure. With regard to turbine blades it is known to provide dampers at the root and tip of the blade. Such positioning of dampers is not optimised for damping out vibration particularly over a full range of vibration frequencies typical within a gas turbine engine. It will be understood that external damping systems are not applicable due to the relatively high temperature inherent within gas turbine engines.

More recently internally tuned vibration dampers have been utilised but in such circumstances generally it is necessary to tune each damper for each individual blade and this can be costly and a time consuming process. Furthermore, the dampers are liable to fatigue and will diminish in terms of operational performance over the life of a blade.

Vibration dampers fitted to the tip and the root of a blade also wear over time and can lose their effectiveness possibly leading to loss of the vibration damper itself and therefore total loss of vibration damping in the blade which may be catastrophic. It will be understood that a blade, if not subject to appropriate damping, may be potentially lost in service causing damage within a blade assembly and potential environmental impact dangers about an engine.

Vibration damping is an important requirement with regard to hollow blades such as gas turbine engine blades but achieving adequate damping efficiency can be difficult.

In accordance with aspects of the present invention there is provided a method of forming a vibration damper in a hollow blade, the method comprising selecting a tube of deformable material, at least longitudinally cutting the tube to define a deformation profile comprising a number of cuts or grooves in the tube, placing the tube upon an expandable element, inserting the tube and the expandable element as a combination into a cavity within the hollow blade then expanding the tube with the expandable element for retention of the tube in the hollow cavity, retracting the expandable element whereby the deformation profile is defined to provide through differential movement in the cavity a desired level of vibration damping by friction engagement with part of the hollow cavity.

Also in accordance with aspects of the present invention there is provided a damper for vibration damping in a hollow blade, the damper formed from a deformable material tube and at least longitudinally slotted to define a deformation profile relative to a hollow cavity in use, the deformation profile achieved by expanding radially and retained by the nature of the deformable material once expanded, the deformation profile comprising differential cuts and/or grooves in the tube.

Generally, the expandable element is an inflatable device. Typically, the tube is expanded radially outwards from a central axis of the tube.

Typically, the cuts or grooves are all substantially longitudinal and extend variably in terms of length and/or spacing from adjacent cuts or grooves in the tube. Possibly some of the cuts or grooves are angled to subtend an arc of the circumference of the tube. Possibly, the deformation profile includes circumferential cuts or grooves partially extending between longitudinal grooves or cuts in the tube.

Possibly, the cuts and/or grooves have a variable depth and/or width. Possibly the variation in depth and/or width is along the length of the cuts or grooves. Possibly, the variation in depth and width is relative between cuts and/or grooves in the deformation profile.

Typically, the cuts or grooves in the deformation profile are symmetrically distributed. Possibly, the cuts or grooves in the deformation profile are asymmetrically distributed about the circumference of the tube. Typically, the tube, prior to deformation and expansion, is round.

Normally, the tube is made from a shape memory alloy or metal.

Embodiments of aspects of the present invention will now be described by way of example with reference to the accompanying drawings in which.

As indicated above vibration control within such hollow structures as hollow blades and in particular turbine blades within gas turbine engines is important in order to maintain the operational life of such blades as well as avoid potential dangers through fatigue failure of the blade in service. Traditional vibration dampers can wear over an operational life and typically have related to damping systems which act at the root or tip of a blade. By aspects of the present invention the pre-existing hollow blade which incorporates a hollow cavity can be used and a damper inserted retrospectively or as part of the normal production process for the blade or other hollow structure.

Aspects of the present invention relate to provision of a tube in the form of a stent which is inserted within the hollow cavity of a blade to provide a damper for vibration damping. Vibration damping is achieved by differential movement of the tube against the walls of the hollow cavity as the blade vibrates. This differential movement causes friction with the hollow cavity surface removing energy from the blade and so providing vibration damping.

As will be described later a tube in the form of a stent in accordance with aspects of the present invention is presented upon an expandable element such as a disposable or retractable inflation device. The tube in such circumstances is located within a hollow cavity within the hollow blade utilising pre-existing inspection ports. Once the tube is in place the expansion element, that is to say the inflation device expands, forcing the sides of the tube outwards into engagement with the hollow cavity wall. Once expanded the tube is retained in position by the nature of the material from which the tube is formed. Similarly, once formed the expandable element, that is to say the inflation device is retracted and normally reduced to its pre-expansion size or less to allow such removal. The expansion element could also be reconfigured in some way to allow removal.

Figure 1:
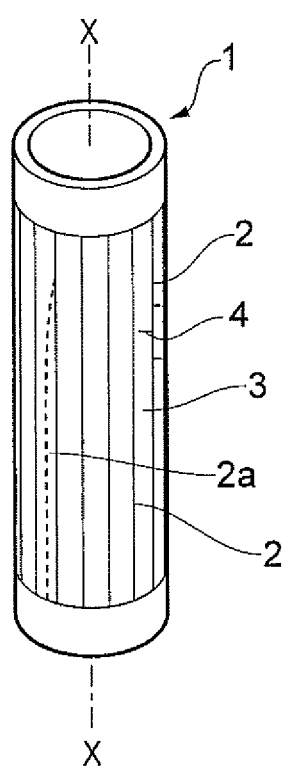
FIG. 1 is a schematic perspective view of a tube utilised to provide a vibration damper in accordance with aspects of the present invention prior to deformation and expansion.

FIG. 1 provides a schematic perspective view of a tube in the form of a stent prior to insertion. In such circumstances the tube 1 comprises a hollow section of tube in which cuts or grooves 2 are formed. These cuts or grooves are in a deformation profile in order to achieve the expanded state for the tube 1 in use. As illustrated the cuts or slots or grooves 2 generally extend longitudinally consistent with and parallel to the longitudinal axis X-X of the tube 1. It will be understood that the distribution of the grooves or cuts or slots 2 determines the expanded deformation profile state. In such circumstances spacing 3 between cuts or slots or grooves is important in order to determine the eventual deformation profile. Careful consideration will be made with regard to each blade in terms of the necessary vibration damping response required in use by the vibration damper formed in accordance with aspects of the present invention.

Generally, the cuts or slots 2 in the deformation profile will extend as continuous or discontinuous features at least longitudinally and possibly solely longitudinally as illustrated in FIG. 1. Alternatively, where required the grooves or cuts or slots 2a (shown in broken line) can be at an angle to vary the deformation profile achieved on expansion. Furthermore, some more circumferential slots or cuts or grooves 4 may be provided which extend outwardly and circumferentially from principal longitudinal cuts or grooves 2 or independently between cuts or grooves 2 dependent upon requirements. It should be understood that the cuts or grooves in effect are provided to preferentially weaken the tube 1 and therefore achieve the desired deformation profile in use upon expansion.

FIG. 2 illustrates again schematically the tube 1 in an expanded state (deformation profile) typically when located within the hollow cavity of a hollow turbine blade in accordance with aspects of the present invention. Thus, in accordance with the method an expandable element such as an inflation device is located within the tube 1 and the combination then located within a blade as will be described later. Once in position the tube is expanded upon the expandable element and the nature of the material from which the tube 1 is formed results in a deformation profile engaging the hollow cavity within the blade. Such a deformation profile is defined prior to insertion such that contact with wall portions of the hollow cavity results, through friction engagement, in energy absorption during a vibration episode and so damping.

Figure 2:
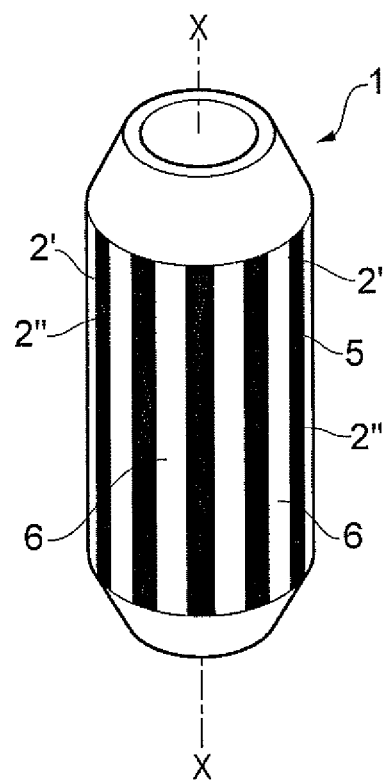
FIG. 2 is an illustration of the tube depicted in FIG. 1 in an expanded state.

The expanded tube 1 as depicted in FIG. 2 comprises the grooves or cuts or slots 2', 2" expanded and opened to create gaps 5 with bands or strips of material 6 between them. In essence the tube 1 is expanded by rupture or stretch upon the grooves or cuts or slots 2 to adopt a profile as illustrated. The size and spacing of the respective gaps 5 and bands or strips of material 6 are determined by the groove or slot distribution created by cutting into the tube 1 during a forming stage for the tube 1. It will be appreciated that as indicated above the grooves or cuts or slots 2', 2" essentially preferentially weaken the tube 1 to achieve the desired deformation profile upon the expandable element for location within the hollow turbine blade in accordance with aspects of the present invention. There is a choice between the grooves and cuts and slots created in the tube 1 and clearly the range of expansion under inflation forces or otherwise which expand the tube in use. Close control of the expandable element will allow adjustment in the deformation size and therefore deformation profile installed in each individual hollow cavity to achieve the desired vibration absorption in accordance with aspects of the present invention. Typically as illustrated the cuts or slots are straight and generally longitudinal in the direction of the axis X-X. Alternatively, it will be appreciated that the cuts or slots may be bowed or curved in an arc across the longitudinal axis (circumferentially) in order to create differential deformation profiles for reciprocation with the hollow cavity within which the tube 1 will be located as a stent in use. It is the expanded deformation profile which will determine engagement with the hollow cavity and therefore the friction absorption of vibration energy in use. Each individual blade may have a different profile in terms of the deformation profile created by the cuts and slots through slicing in the wall parts of the tube 1.

In use possibly a single tube has a single stent within the hollow cavity. Alternatively, a number of tubes may be located in a series "stack" extending along the hollow cavity within the blade to create differential deformation profiles at different positions and therefore different vibration energy absorption rates. It may also be possible to provide concentric or circumferential or edge overlap either partially or fully between tubes to again adjust the deformation profile and therefore the vibration energy absorption response of a damper in accordance with aspects of the present invention.

Figure 3:
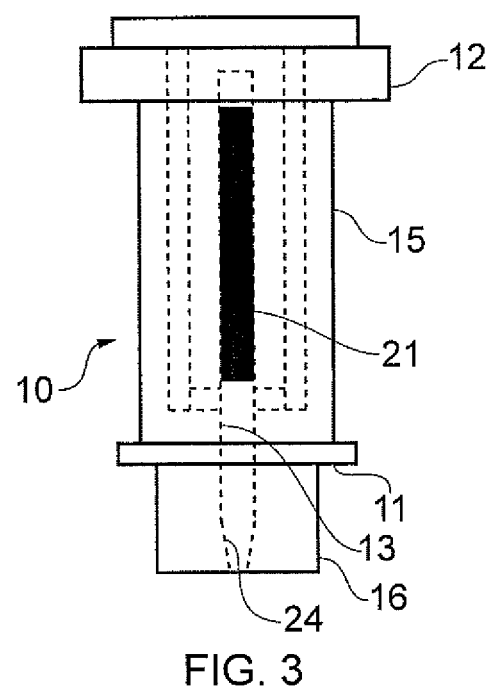
FIG. 3 is a schematic side cross section of a tube in accordance with aspects of the present invention located within a hollow blade.

FIG. 3 provides a schematic side cross section of the tube in the form of a stent located within a hollow turbine blade 10. As can be seen the hollow turbine blade 10 has a platform 11 and a shroud 12 at opposite ends of an aerofoil 15 and a root 16 attached to the platform 11. In terms of the method of forming the vibration damper in situ as indicated a tube 21 is located within a hollow cavity 13 within the aerofoil 15 through typically a pre-existing coolant feed passage, inspection aperture or port 24 which extends through the root 16 and platform 11 to the hollow cavity 13. The tube 21 is expanded upon an expandable element (not shown) for retention within a hollow cavity 13. Once located, it will be appreciated that parts of the deformation profile for the tube 21 engage reciprocal wall parts of the hollow cavity 13. Such reciprocation may be dependent upon the shape of the hollow cavity 13 but also in accordance with aspects of the present invention the relative force of engagement between the expanded tube 21 and opposed wall parts of the hollow cavity 13 can be adjusted such that an appropriate vibration damping response is achieved.

Once the tube 21 is located it will be understood that the expandable element is removed again through the port 24. The expanded tube 21 in the deformation profile is retained by the expanded nature of the material from which the tube 21 is formed. Typically, the tube 21 can be formed from a shape memory material, and thus may provide additional benefits as outlined below.

To summarise the process or method for forming a vibration damper in a hollow blade it will be understood that initially a tube of an appropriate size is chosen. The tube will be hollow and open typically at both ends. The tube will be formed from a deformable material and may comprise a shape memory alloy or stainless steel. The tube will be processed in order to provide at least one longitudinal slot along the principal axis of the tube to define a deformation profile. The tube is then placed upon an expandable element which will typically be an inflation device and the whole combination inserted into the hollow cavity through an inspection port or coolant feed channel. Once positioned using an appropriate method such as a sensor for determining position or simple insertion depth extrapolation upon the expandable element the tube will be expanded. In the expanded state the deformation profile will be achieved and the tube retained within the hollow cavity. The deformation profile as indicated is defined to achieve through differential movement with opposed parts of the hollow blade a desired level of damping or friction energy absorption at that association between the expanded tube and parts of the hollow cavity.

Generally, the tube is relatively thin to provide sensitivity and accuracy of deformation profile creation. Alternatively, the tube may be formed with a slightly thicker cross section in the walls for more robust retention of the deformation profile. Once a suitable tube is chosen it will be understood that at selected positions cuts or slots will be formed in the tube wall.

These cuts or slots may extend fully, or partially, through the thickness of the tube material. As indicated generally the cuts or slots will mostly extend longitudinally but may have varying lengths and depths and as indicated may have a slight angling or even circumferential branches to adjust the deformation profile accordingly. It will be understood that the depth of the grooves or cuts and slots may vary as indicated from full depth to limited surface scratching to adjust locally the expansion resistance (weakness) of the tube under expansion deformation and therefore the eventual probable deformation profile for engagement with the hollow cavity. It will also be understood that the cuts or slots or grooves may also include simple material characteristic changes such as locally increased malleability or ductability and so rather than opening the tube remains intact but with stretched sections in the deformation profile.

The expandable element in accordance with aspects of the present invention may comprise a disposable inflation device. If disposable it will be understood that it may not be necessary to completely remove the expandable element once the deformation profile is achieved. In any event, the expandable element in the form of an inflation device will expand forcing the sides of the tube outwards in a radial direction to engage the cavity wall within the blade. Advantageously, the expansion device typically in the form of an inflation element will be removed normally through the access port for the combination initially utilised for entry. If the tube is closed at one end the expansion may also create some longitudinal extension to locate the tube between lips or ridges in the hollow cavity but a closed end may have detrimental effects such as reducing coolant flow in the cavity.

Once in situ the deformed tube in the deformation profile acts as a friction damper inside the hollow turbine blade. As the blade vibrates in use differential movement causes friction which in turn removes friction energy from the blade damping that vibration of the blade in use. It is possible that the expandable element may differentially expand along its length to vary the degree of local radial expansion applied to the tube. Furthermore, the expandable element may be configured whereby sections of the element and so tube can be variably expanded dependent upon operational requirements.

Advantageously, the tube utilised according to aspects of the present invention as indicated will be formed from a shape memory material. To adjust or alter the differential movement in terms of friction energy absorption it will be understood that the tube may be coated upon a surface which engages the inner wall part of the hollow cavity formed within the blade. This coating may adjust the friction coefficient effective between the tube and the wall surface of the hollow to achieve a desired performance level and/or enhanced operability in terms of durability and reliability.

As indicated above the tube in the form of a stent will typically be introduced into a blade such as a gas turbine engine turbine blade such that the tube is retained within a hollow cavity. Insertion will be through an existing hole such as a coolant entry hole utilised for providing cooling within the turbine blade. As will be appreciated in such circumstances and as is preferential in accordance with aspects of the present invention the expandable element will therefore be removed in order to maintain that cooling capability within the turbine blade. In order to ensure appropriate location it may be possible that the tube and/or the expandable element is tagged whereby location can be determined externally through X-ray or ultrasound or radio activity sensing.

It will be appreciated that of high importance with regard to aspects of the present invention is the appropriate positioning and shape of the grooves or slots or cuts formed by cutting into the tube in order to define the deformation profile. It will be appreciated that it is these slots, cuts and other features such as holes in the tube which will alter the relative strength of the tube and therefore achieve the desired deformation profile when expanded. It is important that the tube is expanded in a controlled manner and therefore the tube should be formed from a suitable flexible material although possibly being a shape memory alloy or having ductility to avoid cracking and other material working effects which may weaken and reduce overall operational life for the tube as a vibration damper in use. An example of an appropriate deformation profile would be to increase the relative number of slots or cuts, that is to say the density and spacing of such features on one side of the tube relative to the other such that this section of the tube will be relatively weakened and in such circumstances will expand more. By such a variable or asymmetric expansion it will be understood that the engagement with the hollow cavity wall will be variable and in such circumstances vibration absorption will occur. The distribution of slits and slots and grooves and other features formed in the tube to achieve the deformation profile may be symmetric but normally will be asymmetric to achieve the desired vibration damping effects through friction energy absorption. Typically zones or portions of the tube will have differential numbers and spacings of slits and slots etc as well as other features in the tube to adjust and weaken it differentially about its circumference to achieve the desired deformation profile when expanded by the expandable element.

As the tube formed in accordance with aspects of the present invention is generally presented along the length of the blade, that is to say the hollow cavity it will be understood that the amount of vibration damping is generally relatively high and may be optimised as the damper in accordance with aspects of the present invention is sited essentially along the axis of greatest vibrational movement. Furthermore, it will be understood that the contact surfaces between the tube and the hollow cavity walls are relatively large and in such circumstances vibration damping is increased and the propensity for wear decreases as it is averaged over the whole contact area rather than at specific points.

As indicated above it is advantageous if the tube in accordance with aspects of the present invention is formed from a shape memory alloy. All the materials may be expanded to retain their expanded shape through the expandable element. A particular advantage with regard to shape memory alloys is that such alloys can be made to expand in their own right to the expanded state or expand further or contract thereafter dependent upon temperature. Thus, such tubes can provide vibration damping throughout the life and thermal cycles of the engine within which the turbine blade is located and possibly proportionately. It will be understood that the shape memory alloy may be activated by the heat generated within the engine within which the turbine blade is located. In such circumstances as the heat level increases the shape memory alloy may expand proportionately in its own right to engage the hollow cavity wall surfaces such that vibration damping occurs. In such circumstances care must be taken with regard to ensuring that the temperature of the hollow blade within which the tube is located is related to some degree with the level of vibration damping required in the turbine blade. It will also be understood that the surface to surface friction between the tube damper and the cavity will create heat which in turn may be used for shape memory control and as a further vibration damping control regime.

Generally the tubes utilised in accordance with aspects of the present invention will be round such that the tube damper is substantially cylindrical with the slots and cuts located appropriately. Alternatively it may be possible to provide a tube which has a different cross section for example oval or triangular or square or rectangular dependent upon the hollow cavity to be accommodated and the engagement with the cavity wall surfaces for friction vibration energy absorption required.

Modifications and alterations to aspects of the present invention will be appreciated by persons skilled in the technology. As indicated above, for example a shape memory material may be advantageous in order that this material can expand in its own right under the shape memory alloy nature of such material to engage the cavity wall surfaces. Alternatively, the shape memory alloy may be utilised to expand or contract the tube when required when vibration damping is not required or a different vibration damping level or frequency in terms of configuration is required. The shape memory material may be arranged to expand radially as with an expandable element or may be designed to crinkle longitudinally to alter the engagement with the hollow cavity wall surface. The tube may comprise stainless steel.

The invention claimed is:

1. A method of forming a vibration damper in a hollow blade, the method comprising selecting a tube of deformable material, cutting the tube at least longitudinally to define a deformation profile comprising a number of cuts in the tube, placing the tube upon an expandable element, inserting the tube and the expandable element as a combination into a hollow cavity within the hollow blade, expanding the tube by expanding the expandable element for retention of the tube in the hollow cavity, retracting the expandable element from the hollow blade whereby the deformation profile is defined to provide, through differential movement in the hollow cavity, a desired level of vibration damping by friction engagement with part of the hollow cavity.

2. A method as claimed in claim 1 wherein the expandable element is an inflatable device.

3. A method as claimed in claim 1 wherein the tube is expanded radially outwards from a central axis of the tube.

4. A method as claimed in claim 1 wherein the cuts are all substantially longitudinal and the spacing between adjacent cuts in the tube varies.

5. A method as claimed in claim 1 wherein the cuts are all substantially longitudinal and the lengths of adjacent cuts in the tube varies.

6. A method as claimed in claim 1 wherein some of the cuts are angled to subtend an arc of the circumference of the tube.

7. A method as claimed in claim 1 wherein the deformation profile includes circumferential cuts partially extending between longitudinal cuts in the tube.

8. A method as claimed in claim 1 wherein the cuts have a variable depth along the length of the cuts.

9. A method as claimed in claim 1 wherein the cuts have a variable width along the length of the cuts.

10. A method as claimed in claim 1 wherein the cuts in the deformation profile are symmetrically distributed about the circumference of the tube.

11. A method as claimed in claim 1 wherein the cuts in the deformation profile are asymmetrically distributed about the circumference of the tube.

12. A method as claimed in claim 1 wherein the tube, prior to deformation and expansion, is round.

13. A method as claimed in claim 1 wherein the tube is made from a shape memory material.

14. A method as claimed in claim 1 wherein the slots extend through the full thickness of the tube.

\* \* \* \* \*